S. W. FRANSSON.
CUTTING AND WELDING TORCH.
APPLICATION FILED AUG. 29, 1917.
1,290,536.
Patented Jan. 7, 1919.
2 SHEETS—SHEET 1.
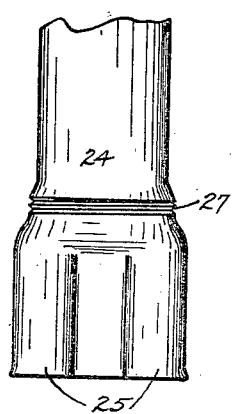
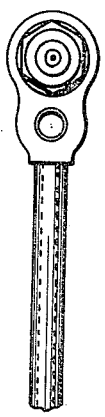
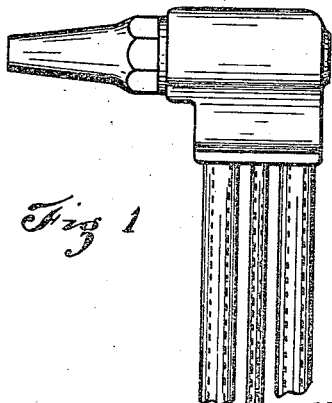
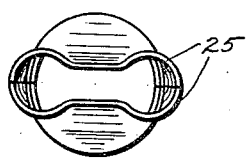
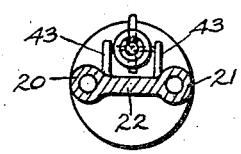
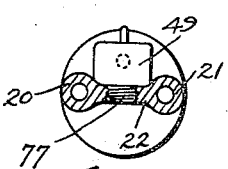
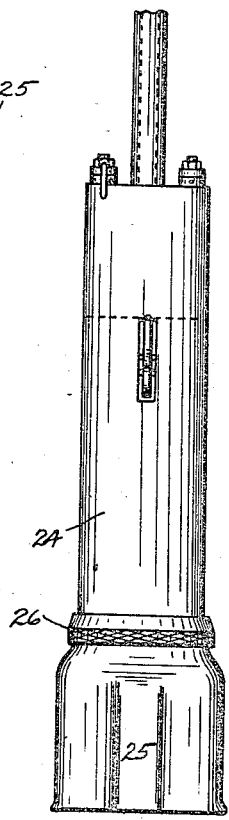
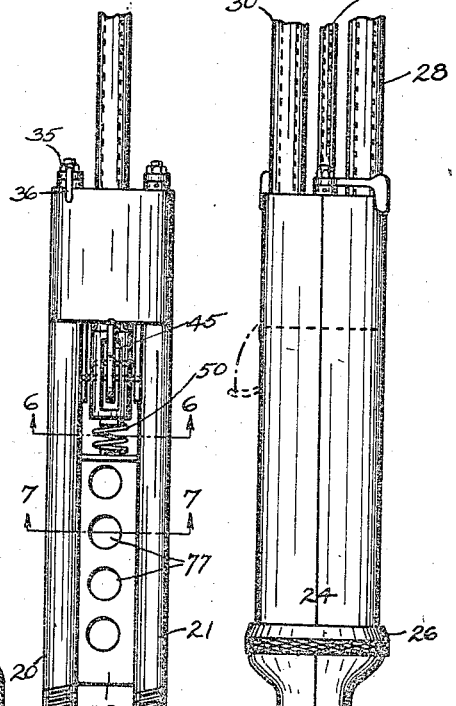
INVENTOR.
Sven W. Fransson.
BY Aladar Hamburger
his ATTORNEY

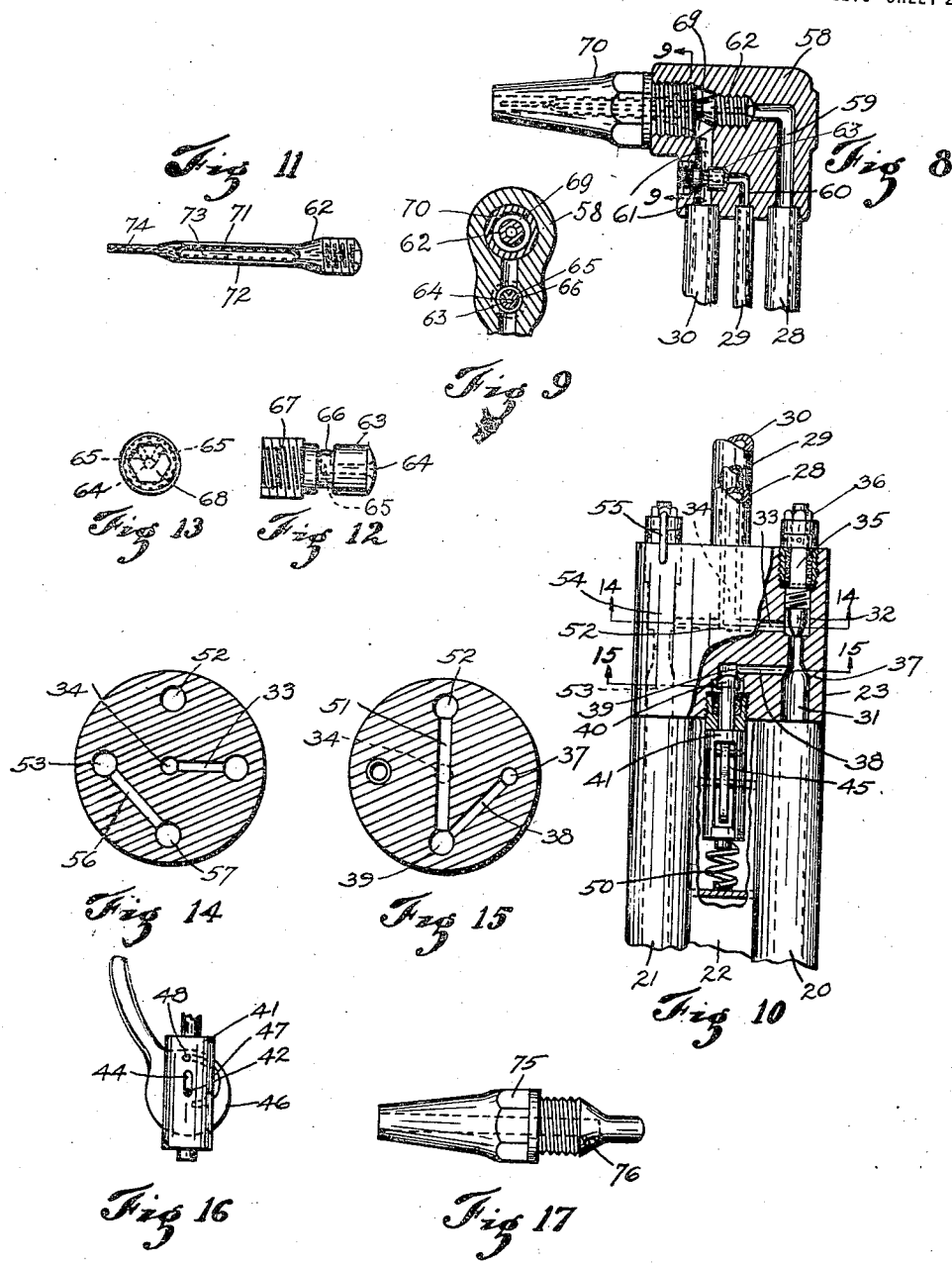

UNITED STATES PATENT OFFICE.

SVEN W. FRANSSON, OF BROOKLYN, NEW YORK.

CUTTING AND WELDING TORCH.

1,290,536.  Specification of Letters Patent.  Patented Jan. 7, 1919.

Application filed August 29, 1917. Serial No. 188,852.

*To all whom it may concern:*

Be it known that I, SVEN W. FRANSSON, a citizen of the United States, residing at Brooklyn, in the county of Kings and State of New York, have invented new and useful Improvements in Cutting and Welding Torches, of which the following is a specification.

This invention relates to a cutting and welding torch and has as its principal object to provide, in a device of this character, means whereby different gases, such as acetylene, hydrogen, city gas, etc., may be used, in a mixture with oxygen to produce the desired results. A further object is to provide means whereby all the inlet valves may be opened and closed with the fingers of the hand in which the torch is held, leaving the other hand of the operator entirely free for other functions. A still further object is to provide means whereby the flexible tubes which connect the torch to the supply tanks or other sources of gas supply may be protected from injury by bending the torch and to minimize the wear and tear on them at the point of connection with the torch.

In the accompanying drawings:

Figure 1 is a fragmentary side elevational view of the torch and Fig. 2 a bottom view thereof.

Fig. 3 is a fragmentary bottom view of the handle part of the torch, with certain parts removed for a better view.

Figs. 4 and 5 are side elevational and end views, respectively, of a part of the device.

Figs. 6 and 7 are cross sectional views of the handle, taken on the lines 6—6 and 7—7, respectively, of Fig. 3.

Fig. 8 is a partly sectional, partly elevational view of the head of the torch and Fig. 9 a cross section thereof, on the line 9—9 of Fig. 8.

Fig. 10 is a fragmentary plan view of a portion of the torch, showing the valve arrangement.

Fig. 11 is a side elevational view of the oxygen tip for cutting purposes.

Figs. 12 and 13 are side elevational and cross sectional views, respectively, of the mixing plug of the device.

Figs. 14 and 15 are cross sectional views of a portion of the torch, taken on lines 14—14 and 15—15, respectively, of Fig. 10.

Fig. 16 is a side elevational view of the valve stem for the oxygen inlet valve for cutting purposes, and the trigger for operating the same.

Fig. 17 is a side elevational view of the welding tip.

The same reference character refers to the same part throughout the different views.

Referring more particularly to the drawing, 20 is the inlet pipe for the oxygen and 21 the inlet pipe for the combustible gas, both threaded at their lower ends for attaching thereto the flexible tubes connecting the torch with the sources of supply. The inlet pipes 20 and 21 are connected by a horizontal web portion 22 and formed integrally with a valve head 23. A cover 24 composed of two semi-cylindrical portions, formed integrally with an apron 25, and held in place by an annular nut 26 fitting over the threaded portion 27 of the cover, completes, with the parts hereinbefore described, the handle of the torch. As will be seen from the drawing, the apron is so formed that the flexible tubes to be attached to the inlet pipes, and not shown in the drawing, as they form no part of the invention, will be kept separated from each other in sufficiently wide compartments to prevent their being bent at a sharp angle and thus eliminate the wear and tear upon them at the most delicate portion, the threaded ends of the inlet pipes.

In the valve head 23 are secured three pipes, one under the other, the topmost, 28, being the oxygen pipe for the cutting operation, the central one, 29, the oxygen pipe for the welding and for the pre-heating flame in the cutting operation, and the lowest one, 30, the combustible gas pipe. The connections of these pipes with the inlet pipes through the valve head 23, with their respective valves, may be best seen in Figs. 10, 14 and 15, where a channel 31 proceeds straight forward from the inner end of the pipe 20 to the valve 32 and from there, at right angles as at 33, to the center of the valve head 23, and then again straight forward to the pipe 29, as at 34. The valve 32 is provided with a threaded stem 35, operated by a handle 36 in the usual manner. From the channel 31, at a portion where it narrows conically, as at 37, a duct 38 is formed diagonally downward to the longitudinal center of the valve head 23 and there abuts into a valve chamber 39 normally closed by the valve 40. The latter has a cylindrical stem 41 longitudinally slidable on a pin 42 mounted in lugs 43 projecting downward from the pipes 20 and 21, as best seen in Fig. 6. The valve stem 41 has slots 44 formed therein through which the pin 42 passes, horizontally, and a vertical slot 45 into which is inserted a trigger 46 pivoted on the pin 42. In the trigger 46 is made a curved slot 47, one part of which is circular, with the pin 42 as the center of the circle, while the other part of the slot 47 is gradually approaching the said pin, in a parabolic curve, as best seen in Fig. 16. A pin 48 is secured in the two sides of the slot 45 and passes through the slot 47, so that when the trigger is pulled, the valve stem 41 remains stationary while the pin 48 traverses the circular portion of the slot 47, whereas when it reaches the parabolic portion of the slot 47, the stem 41 is gradually pulled backward and the valve 40 opened thereby. A coil spring 50 between the rear end of the stem 41 and a lug 49 projecting downward from the web 22, tends to keep the valve 40 normally closed. As will be seen in Figs. 3 and 10, the web is partly cut away at the portion where the valve stem 41 and associate mechanism is mounted.

After passing the valve 40, the oxygen enters a channel 51 going straight up to near the top of the valve head 23 and there abuts into another channel 52 which is horizontal and connects with the pipe 28.

The combustible gas entering through the inlet pipe 21 passes through a horizontal channel 53 to a valve 54 similar to the valve 32 and having a handle 55 which operates in an opposite sense of that of the handle 36, i. e. both open the respective valves when pushed away from the pipe 28, downwardly and outwardly, and close the same when pushed in the opposite sense. Either operation may be performed by a thumb of the hand holding the torch.

From the valve 54 the gas passes through a diagonal downwardly arranged duct 56, from there into a horizontal duct 57 which abuts into the pipe 30.

To the upper ends of the pipes 28, 29 and 30 is secured the head of the torch, 58, said pipes abutting into channels 59, 60 and 61, made in the head 58, respectively. The channel 59 proceeds first horizontally and then, at a right angle, vertically downward. At its end, there is a threaded hole into which is inserted the threaded rear end of the so called cutting tip 62, shown in detail in Fig. 11. The oxygen passes right through the bore of this tip from its rear end to its front end.

The oxygen from the pipe 29 passes through the channel 60 into the rear end of a mixing plug 63 into a passage 64 bored through its center and from there through a pair of ducts 65 diverging in a V-shape and abutting into an annular groove 66 provided in the mixing plug 63. This groove is situated in the axis of the channel 61 which serves as a mixing chamber for the combustible gas emerging from the pipe 30 divided into two streams by the plug 63, and the oxygen emerging from the ducts 65 right in the path of the respective streams of combustible gas, whereby a thorough mixing of the gases results and no dead corners are left unswept by the pressure of the gas which could result in ignition of gas inside of the mixing chamber, in case of back firing. The mixing plug is inserted into an appropriate recess provided in the head 58 of the torch, as seen in Fig. 8, and held there by a threaded portion 67. A hexagonal recess 68 is provided in its outer face for the insertion thereinto of a key.

The mixture of combustible gas and oxygen from the pipes 29 and 30 passes from the channel or mixing chamber 61 into a chamber 69 provided in the head 58, around the cutting tip 62, the chamber 69 having a threaded opening into which is secured the nozzle 70 in a way obvious from Fig. 8. The bore of the nozzle 70 is so dimensioned that it holds the cutting tip 62 firmly in alinement therewith, by contact with its round sides 71 and 72 and allows the gas mixture from the chamber 69 to escape past its flattened sides 73. The outer end of the cutting tip, 74, being of reduced diameter and cylindrical, the gas will envelop it entirely and, when lighted, will produce an even and steady flame.

When the torch is used for welding, the cutting tip and nozzle are removed from the head 58 and the welding tip 75 substituted therefor (shown in Fig. 17) which closes the mouth of the channel 59 and has an inlet hole 76 at one side of its rear portion in communication with the channel or mixing chamber 61.

When using the torch for cutting, the cutting tip and the nozzle being secured in the head, the combustible gas valve is first opened and the combustible gas is lighted as it emerges from the nozzle, whereupon the oxygen valve leading to the pipe 29 is opened and the metal pre-heated with the resulting flame. Thereafter the valve serving the cutting tip through the pipe 28 with oxygen, is opened by pulling the trigger against the tension of the spring, with one finger, preferably the middle finger, and is thus held open until the operation is finished. By releasing the trigger, the valve will be closed automatically, whereupon the other two valves may easily be closed by pushing up the handles with a thumb and forefinger. This feature is very important in cases when the torch, as it often happens, back-fires, i. e. the gas ignites within the torch. In such cases, if the valves are not promptly closed, the torch becomes too hot to be held in the hand of the operator and must be thrown down by him, whereupon the flame may creep up to the supply tanks and often causes explosions therein. Now, the hand of the operator which does not hold the torch is often unavailable for closing the valves, for instance when the operator works in a place where he has to hold himself with one hand and would fall if he releases his hold.

When used for welding, the cutting tip and nozzle have to be screwed out of the head and the welding tip substituted therefor. In this case the trigger will not be used, but only the other two valves in the same way as described in regard to the cutting operation.

The main part of the invention is the use of the mixing plug with its groove, the width and depth of which regulates the quantity of the combustible gas supply. In mixing this gas with the oxygen for cutting and welding purposes, different proportions of oxygen and each of the various combustible gases must be used to obtain the proper results. By varying the size of the groove in the mixing plug, the proportion of the combustible gas to the oxygen can easily be regulated. To obtain this result, mixing plugs with different sized grooves are provided for each torch and conveniently carried therein, secured in threaded holes 77 provided in the web portion of the torch handle, shown in Figs. 3, and 7.

What I claim is:

1. A cutting and welding torch, comprising, in combination, a handle formed of a pair of inlet tubes, connected by a web portion, and a cover removably mounted thereon, a valve head integrally formed with said inlet tubes, valves in said valve head adapted to distribute the oxygen, entering by one of said inlet tubes, into two separate connecting tubes, one beneath the other, and the combustible gas, entering by the other of said inlet tubes, into a third connecting tube, underneath said first mentioned connecting tubes, the plane of said connecting tubes being at right angles to that of said inlet tubes, a torch head secured to the farther ends of said connecting tubes, means in said torch head for interchangeably inserting therein a cutting tip and nozzle, and a welding tip, respectively, means for admitting the oxygen from the topmost connecting tube directly into said cutting tip, when the latter is inserted in the torch head, and to prevent the flow of oxygen from said topmost connecting tube, when the welding tip is inserted into the torch head, a mixing chamber in said torch head, and mixing plugs with grooves of various sizes adapted to be alternately inserted into said mixing chamber, in the path of the combustible gas entering the same from the lowermost connecting tube and in communication with the oxygen entering from the intermediate connecting tube.

2. In a cutting and welding torch head, means for alternately inserting therein a cutting and a welding tip, respectively, an inlet for combustible gas, two separate inlets for oxygen, a mixing chamber for mixing the combustible gas with oxygen from one of said inlets, before the same enters any of said tips, and means for interchangeably inserting into said mixing chamber mixing plugs with grooves of different sizes, so as to regulate the proportion of combustible gas and oxygen admitted thereinto, said mixing plugs being insertible and removable without interfering with said tips.

3. In a cutting and welding torch, having a handle and a head, means in said head for interchangeably inserting therein mixing plugs of various construction, and means in said handle for removably securing therein a supply of such plugs adapted to be alternately inserted into said head.

SVEN W. FRANSSON.